Patented Nov. 21, 1944

2,363,289

UNITED STATES PATENT OFFICE 2,363,289

METHOD OF MOISTUREPROOFING CELLULOSIC SHEETS

Frank David Bergstein, Cincinnati, Ohio

No Drawing. Application June 21, 1940,
Serial No. 341,742

4 Claims. (Cl. 117—145)

My invention relates to the manufacture of moistureproof materials, suitable for use as a protective wrapping, and for fabrication into bags or other types of protective packages. Among the objects of my invention is the provision of a coated sheet which is smooth and free from tackiness, having an extremely high degree of flexibility and moisture-vaporproofness, wherein the coating is securely anchored to the base sheet, providing flexibility over extended lengths of time and under various temperature conditions, and which is capable of bonding by heat, for sealing purposes. A further object of my invention is to accomplish these results by high temperature coating application, without the need for solvents.

As the base sheet I may use any flexible material such as paper, including among the various grades thereof, kraft, glassine, or the like, or foils. However, my invention is further particularly adapted to the use of transparent non-fibrous base sheets, in which category regenerated cellulose, such as Cellophane either plain or moistureproof, is preferred. However, a transparent film such as those prepared from rubber derivatives (such as Pliofilm) may be used. Cellulose derivative films such as cellulose nitrate, cellulose acetate, or ethyl cellulose, may also be utilized, or practically any such non-fibrous type of base which retains its flexibility.

I found that by applying to base sheets, such as described above, a moistureproofing composition in a molten state, comprising essentially a wax or wax mixture, one or more hydrocarbon polymers (for example high or low molecular weight "Vistanex," or both) and a cyclized rubber, I can produce a coating material which has the following characteristics:

(1) An exceedingly high resistance to the penetration of moisture and vapor, the resistance being much higher than that of moistureproof coated cellulosic sheets, such as "moistureproof Cellophane" now available, and also impermeability to liquids such as water or milk.

(2) Permanent pliability under varying degrees of temperature.

(3) A high degree of mechanical strength.

(4) Heat fusibility; thus when a joint is formed as in a bag by means of heat and pressure, it provides an excellent strong bond.

(5) An excellent anchorage to wrapping materials and to cellulosic sheets whether plain or moistureproof, whereby I obtain a mechanically strong, moisture-vaporproof, liquid-tight, hermetical seal.

(6) A substantially hard, non-tacky surface.

(7) When applied to cellulosic sheets such as "Cellophane," plain or moistureproof, my coating will impart a plasticity to such material, making same much more permanent under varying degrees of temperature and more plastic and stretchy than without.

The hydrocarbon polymer can be made, for example, according to Patent No. 2,051,840, and is available on the market under the trade name "Vistanex," made by the Standard Oil Co. of New Jersey. It may be made by the hydrogenation of raw rubber, either natural or synthetic; but preferably it is obtained by polymerizing the isobutylene fraction in the cracking of gasoline. The polymerization is carried out at a temperature of about —60 to —80° C. in the presence of a catalyst. Polymerization takes place rapidly and products of varying degrees of polymerization are formed. For purposes of the present invention I prefer to use high molecular weight polymers, or mixtures thereof, which will be more fully explained in the examples and the description which follows.

The cyclized rubbers may either be those produced by the Goodyear Rubber Company and sold under the trade name "Pliolite," or those produced by the Marbon Company and sold under the trade name of "Marbon B," or other similar resins.

For the wax or moistureproofing ingredient, a high melting paraffine wax, such as 140° F. is preferred. However, ceresins, carnauba wax, hydrogenated castor or cottonseed oil, or other natural vegetable, mineral, or synthetic waxes may be employed either singly or mixed. Where mixtures of waxes are employed, the balance between the waxes is determined with reference to their properties.

One method of preparing the composition is to combine the hydrocarbon polymers and waxes in a mixer in the presence of heat and after the mixture is in a molten state then add the cyclized rubber slowly, while continuing the mixing, at a temperature of approximately 200° F.

The following are set forth as illustrative examples of the composition:

Example I

| | Percent by weight | |
|---|---|---|
| Paraffine (melting point 140° F.) | 75 | |
| Vistanex (high molecular weight about 60,000) | 20 | 90 parts |
| Vistanex (low molecular weight 12,000 to 15,000) | 5 | |
| Cyclized rubber (either Pliolite or Marbon B) | | 10 parts |

*Example II*

|  | Percent by weight |  |
|---|---|---|
| Paraffine (melting point 140° F.) | 65 | |
| Vistanex (high molecular weight about 60,000) | 28 | 95 parts |
| Vistanex (low molecular weight 12,000 to 15,000) | 7 | |
| Cyclized rubber (either Pliolite or Marbon B) | | 5 parts |

These compositions as above are preferably applied to the base sheet at a temperature of about 180 to 250° F., the higher the percentage of high molecular weight Vistanex and cyclized rubber, the higher the temperature is required for coating. Any suitable coating means may be employed, such as a roll coating or blade coating, or a combination of the two, at a suitably elevated temperature to spread a thin layer of the composition of the desired thickness on the base sheet. After the coating is spread it is cooled preferably by passing the web over chilled rolls, or through a low temperature chamber.

A coating thus prepared is much more efficient in resisting the transmission of moisture-vapor, is flexible, sufficiently hard to permit winding and handling, etc. in the course of wrapping or fabricating operations, and is tasteless and non-toxic. Thus it is suitable for the packaging of food products. One of its outstanding characteristics is its remarkably high heat-sealability.

For example, if bags are fabricated from this material having such coating, the joints of the bag can be fused by heat to form a tight, strong and dependable hermetic closure. To achieve strength in the heat-sealed joint not only must the coating have inherent mechanical strength and flexibility, but the anchorage of the coating to the base sheet must be sufficiently strong to withstand necessary stresses and strains. And even when applied to a non-porous sheet, such as non-fibrous materials like "Cellophane," the sheet made according to this invention does accomplish this, and the bonding strength under heat is such that in many cases the base stock itself will tear or break before the heat-fused joint is disrupted.

Since it is obvious that various modifications may be made in the above description without departing from the nature or spirit thereof, this invention is not restricted thereto, except as set forth in the appended claims.

Having thus described my invention what I claim as new and desire to secure by Letters Patent is:

1. The method of making a moistureproof sheet material which comprises preparing a molten composition by first combining substantially 65% to 75% by weight of a wax and substantially 35% to 25% by weight of a hydrocarbon polymer of a class consisting of those produced by hydrogenating raw rubber and polymerizing isobutylene, thereafter combining substantially 90 to 95 parts of the material so produced with substantially 5 to 10 parts of cyclized rubber, and coating a flexible cellulosic base with said molten composition in a thickness suitable for the production of a heat-sealable coated sheet, non-tacky at normal temperatures and capable of forming a strong, non-brittle heat-sealed bond.

2. The process claimed in claim 1 wherein the hydrocarbon polymer is a polymerized isobutylene and comprises a proportion of such material of low molecular weight i. e. of 12,000 to 15,000, and a proportion of such material of high molecular weight, i. e. about 60,000.

3. A coating composition for forming heat-sealable, moisture proof sheet material capable of forming a strong, non-brittle, heat-sealed bond, said composition comprising 50% to 80% by weight of wax, 5% to 15% by weight of cyclized rubber and 15% to 35% by weight of a hydrocarbon polymer chosen from the class consisting of hydrogenated rubber and polymerized isobutylene.

4. A coating composition for forming heat-sealable, moistureproof sheet material capable of forming a strong, non-brittle, heat-sealed bond, said composition comprising 50% to 80% by weight of wax, 5% to 15% by weight of cyclized rubber and 15% to 35% by weight of a polymerized isobutylene, containing a proportion of relatively high molecular weight i. e. about 60,000, and containing a proportion of relatively low molecular weight i. e. 12,000 to 15,000.

FRANK DAVID BERGSTEIN.